United States Patent Office 3,631,139
Patented Dec. 28, 1971

3,631,139
THERMOSETTING ORGANOPOLYSILOXANE
MOLDING MATERIALS
Ignaz Bauer and Siegfried Nitzsche, Burghausen, Upper Bavaria, Germany, Rudolf A. Riedle, Adrian, Mich., and Werner Graf, Burghausen, Upper Bavaria, Germany, assignors to Wacker-Chemie G.m.b.H., Munich, Germany
No Drawing. Filed Apr. 23, 1970, Ser. No. 31,401
Claims priority, application Germany, Apr. 23, 1969,
P 19 20 691.8
Int. Cl. C08g 51/34
U.S. Cl. 260—32.8 SB
10 Claims

ABSTRACT OF THE DISCLOSURE

Adding a ketone or metallanolate of a ketone to a polysiloxane composition containing phenyl substituents and residual hydroxyl groups and cured with lead compounds as a molding composition improves the shelf life, reduces the curing time, improves flowability of the composition and produces improvement in the physical properties of the cured molded product.

The present invention relates to a novel heat curable organopolysiloxane molding composition which is a mixture of a siloxane polymer containing phenyl substituents as well as residual hydroxyl groups, a filler, an inorganic lead compound as curing catalyst and a ketone or metallanolate of a ketone.

Heat curable silicone molding materials based on organopolysiloxanes wherein a significant portion of the organic substituents are aryl radicals, particularly phenyl, and having a significant ≡SiOH content, admixed with fillers and a variety of metal catalysts, particularly inorganic lead compounds, have been known in the art (see, e.g., British Pats. No. 1,001,743 and No. 1,054,352). However, these known molding materials exhibit serious deficiencies such as flowability during molding, short shelf life, long curing times and rough surface or uneven coverage of the encapsulated material.

The objects of this invention include introducing a heat hardenable organopolysiloxane molding composition which can be stored for long periods of time and can be stored at temperatures below 50° F. for an unlimited period even in the presence of the curing catalyst. Further objects and advantages of the molding materials of this invention include flowability during molding. Thus, encapsulation of electrical and electronic components can be carried forward with these compositions without use of pressure. Another advantage achieved is short curing time and smooth surfaces on the ultimate cured product. Removal of the cured molded article from the mold itself is readily accomplished as the organopolysiloxanes do not adhere to the mold surface. Finally, the physical and electrical properties of the siloxane composition are excellent and are particularly significant at high temperatures and high frequencies.

The objects and advantages noted above, as well as others, are apparent or will become obvious from the disclosure and claims following.

This invention introduces heat hardenable organopolysiloxane molding materials consisting essentially of (1) siloxane polymers containing phenyl substituents and hydroxyl groups, (2) fillers, (3) inorganic lead compounds as catalysts, and (4) 0.1 to 15% by weight based on the weight of the siloxane polymer (1) of a ketone or metallanolate of a ketone having a boiling point of at least 140° C. at 760 mm. Hg (abs.) and a melting point below the temperature employed for molding the molded materials.

The siloxane polymers (1) employed herein are generally classified as resinous because they contain an average of from 0.9/1 to 1.7/1 organic groups bonded to silicon through Si—C linkages. The operable siloxane resins should contain at least 0.1% by weight of silicon bonded hydroxyl groups and an average of from 0.3 to 1.2 phenyl groups per silicon atom. The operable siloxane resins can also contain up to 3% by weight of alkoxy groups (e.g. methoxy, ethoxy, isopropoxy), as well as monovalent hydrocarbon or halogenohydrocarbon radicals such as alkyl radicals, alkenyl groups, alkaryl groups, aralkyl groups and cyclic as well as halogenated derivatives of such radicals including, inter alia, ethyl, propyl, vinyl, cyclohexyl, benzyl, 3,3,3-trifluoropropyl, dichlorophenyl, $\alpha,\alpha,\alpha$-trifluorotolyl, perchlorovinyl and similar well known hydrocarbon and halogenohydrocarbon radicals bonded to Si in siloxane polymers in the art. Preferred because of availability are the methylphenylsiloxane resins. It should be noted the presence of hydrogen bonded to Si should be avoided because it leads difficulties during storage, particularly because the hydrogen bonded to silicon is easily cleaved, thus causing "gassing."

It is an essential element of the present invention that the organopolysiloxanes employed are so highly viscous that they will flow very slowly if at all at room temperature before curing begins, and particularly after mixing the siloxane polymer with the filler. The mixture of siloxane polymer and filler is expected to be essentially a solid, non-flowing material.

The organosiloxane polymer employed herein can be identical to the previously employed hydroxylated phenyl containing siloxane resins which are heat hardenable and have been employed with fillers and inorganic lead compounds as curing catalysts, for example, as in the above-mentioned British patents.

The fillers (2) employed herein are well known materials previously suggested and used for preparing heat hardenable molding materials. Examples of such fillers are fume silicas, silica hydrogels, silica aerogels, precipitated silicas, quartz flour, mica and mica flour, fibrous natural magnesium silicate, asbestos powder or fibers, calcium silicate, zirconium silicate, titanias, aluminas, glass in the form of powder, frit or fiber, ground porcelain fragments, diatomaceous earths and other known fillers. Mixtures of fillers can be used. The proportion of filler employed is not critical and can vary within wide limits. In general, the filler (2) is employed in amounts of from 50 to 500 parts by weight per 100 parts by weight of the organopolysiloxane (1). The fillers can be pretreated, if desired, in accordance with known methods. Thus, fume silicas can be pretreated with methylsilazanes and other treating agents in accordance with known and recognized procedures.

Similarly, the inorganic lead compound employed as a catalyst (3) herein, includes those lead compounds known for use as curing catalysts in heat hardenable molding materials based on organopolysiloxane-filler mixtures. Examples of such lead compounds include basic lead carbonate $Pb_3(OH)_2(CO_3)_2$, lead carbonate ($PbCO_3$), lead monoxide and lead dioxide. The lead compounds are generally used in proportions of from 0.5 to 5 parts by weight per 100 parts by weight of the organopolysiloxane (1). Mixtures of lead compounds can be used if desired.

The novel ingredient employed herein is the ketone compound (4). The operable ketones can contain more than one keto group. The ketones and metallanolates employed must have a boiling point of at least 140° C. at 760 mm. Hg (abs.) and a melting point below that of the temperature employed in the molding operation. Ketones boiling below 140° C. produce blistered and rough surfaces on the finished product and, of course, the ketone should melt during the molding operation to be effective. Ketones having boiling points above that of acetylacetones are likewise preferred as metallanolates of ketones because the danger of blistering and formation of pores in the product is greatly reduced with such ketones. Examples of suitable ketones and metallanolates of ketones include long-chained aliphatic ketones such as dioctadecyl ketones, distearoyl ketones, diheptadecyl ketones, aromatic ketones such as phenylacetone, benzoylacetone, benzophenone and acetophenone, acetonyl acetone, aluminum-acetyl acetonate, zinc acetyl acetonate, aluminum benzoyl acetonate, cobalt acetyl acetonate and titanium acetyl acetonate. Because the above individual monoketones are not complex formers and the above acetyl acetonates are complex compounds, the effect of ketones and ketone derivatives does not depend on the formation of a complex with the inorganic lead compound (3) employed herein. The effect of the essentially non-volatile ketones and ketone derivatives employed herein appears to be that of a plasticizer and flow agent in contrast to diacetyl which boils at 88° C./760 mm. Hg (abs.). It is surprising and totally unexpected that the ketones and metallanolates do not extend the curing time even though they do not escape during the curing because of the use of pressure during the molding cycle.

Preferably, the ketones and/or metallanolates of ketones of the present invention are used in quantities of 0.1 to 15 parts by weight per 100 parts by weight of the organopolysiloxane. With increasing quantities of ketones or metallanolates of ketones, the flowability of the molding materials becomes greater duuring the molding. The additives of the present invention thus make it possible to control the flowability of the molding materials during the molding and establish a desired rate of flow. Mixtures of various ketones and/or metallanolates can be used.

In addition to the organopolysiloxanes defined above, fillers, inorganic lead compounds and ketones and/or ketone derivatives of the above defined type, the organopolysiloxane molding materials of the present invention can also contain additives common to organopolysiloxane molding materials such as mold release agents, for instance, calcium and aluminum stearate; reinforcing agents, for instance, glass and asbestos fiber cloth; stabilizing agents such as resorcin in quantities of 0.1% by weight calculated on the weight of the organopolysiloxanes, as well as pigments, for instance, iron oxides and carbon blacks. The reinforcing agents and/or pigments can be pretreated just like the above fillers with organosilicon compounds in the known manner.

The components of the molding materials of the present invention can be mixed in any desired succession and according to any desired method which is common for the preparation of organopolysiloxane molding materials. This includes mixing a melt of the organopolysiloxane or the organopolysiloxanes with the other components on a heated 2-roll mill or a heated kneader or mixing a solution of the organopolysiloxane or the organopolysiloxanes in an organic solvent with the other components in a kneader at room temperature and subsequent evaporation of the solvent under reduced pressure. The latter type of mixing the components of the molding materials of the present invention is preferred because no higher temperatures will appear and thus undesired precondensation reactions of the silicon bonded hydroxyl groups is avoided such as can occur when mixing a melt of the organopolysiloxanes with the other components by localized overheating caused by friction warmth.

The processing of the organopolysiloxane molding materials according to the present invention can be followed by spray pressing (transfer pressing), extruding pressing or other molding methods, for instance, simple pressing into plates as well as by spray pouring. The temperatures used for this are generally 150° to 190° C.

The following examples are intended to assist those skilled in the art to gain a full understanding of the invention and the examples do not define or restrict the scope of the invention which is delineated in the claims.

EXAMPLE 1

100 parts by weight of a solid phenylmethylpolysiloxane which is solid at room temperature having more than 0.1 percent by weight of silicon bonded hydroxyl groups, and an average of 0.75 phenyl group per silicon atom and a total of 1.0 SiC bonded phenyl and methyl groups per silicon atom was dissolved in 50 parts by weight of methylenechloride. The mixture thus obtained was mixed in a vacuum kneader with a mixture of 300 parts by weight of quartz flour, 2 parts by weight of calcium stearate, 4 parts by weight of iron oxide black, 1 part by weight of basic lead carbonate and a ketone or metallanolate as shown in Table I. After vaporizing the solvent at reduced pressure, the material was ground into a powder. The molding materials thus obtained were subjected to the following spiral flow test:

The samples to be examined were sprayed into a spray press preheated to 160° C. at a pressure of 100 kg./cm.² in a flow test mold, which was also heated to 160° C. The flow test mold contained a canal having a semi-circular cross-section which was to be at least partially filled by the sample and which had a radius of 1.6 mm. The canal had the form of a Newton spiral. Marks were etched into the canal at distances of 2.54 cm. (equals 1 flow unit), which after curing left identical marks on the spirals which were taken from the mold. The length of these spirals prepared from the molding material shows the degree for the flowability of the material during molding. The results obtained from the spiral flow test are given in Table I. The curing times which are also given in Table I are the minimum times which are necessary to obtain spirals prepared from the molding material in cured and completely pour free condition. Furthermore, the dielectric constant, epsilon, and the dielectric loss factor $T_G$ delta is determined for the articles prepared from the molded materials. The following results are obtained:

TABLE I

| Ketone or metallanolate | Parts by weight | Flow units | Curing times at 160°C. in minutes | Epsilon at 1 kHz.* and 25°C. | To delta at kHz. and 25°C. |
| --- | --- | --- | --- | --- | --- |
| Blind test | | 16 | 3–3.5 | 3.6 | $1.10 \cdot 10^{-2}$ |
| Acetyl acetone | 6 | 30 | 3 | 3.7 | $1.20 \cdot 10^{-2}$ |
| Aluminum acetyl acetonate | 2 | 32 | 3 | 3.7 | $1.15 \cdot 10^{-2}$ |
| Do | 4 | 42 | 3–3.5 | 3.7 | $1.25 \cdot 10^{-2}$ |
| Do | 6 | 45 | 3.5 | 3.7 | $1.30 \cdot 10^{-2}$ |
| Zinc acetyl acetonate | 5 | 18 | 3.5 | | |
| Do | 7.5 | 21 | 3.5 | | |
| Aluminum benzoyl acetonate | 6 | 46 | 3.5 | 3.8 | $1.25 \cdot 10^{-2}$ |
| Cobalt acetyl acetonate | 4 | 33 | 3.5 | 3.8 | $1.10 \cdot 10^{-2}$ |
| Titanium acetyl acetonate | 6 | 27 | 4 | 3.7 | $1.35 \cdot 10^{-2}$ |
| Di-n-heptadecyl ketone | 4 | 36 | 3–3.5 | 3.7 | $1.15 \cdot 10^{-2}$ |

*1 kHz=1,000 vibrations per second.

NOTE: All spirals can be easily demolded.

EXAMPLE 2

The procedures described in Example 1 and the test methods were repeated with the alteration that instead of the organopolysiloxane used in Example 1, a phenylmethylpolysiloxane which was solid at room temperature with more than 0.1% by weight of silicon bonded hydroxy groups, 1% by weight ethoxy groups, 0.726 phenyl group per silicon atom and a total of 1.1 SiC bonded phenyl and methyl groups per silicon atom was used and a metallonolate or ketone, which can be chosen from Table II, was incorporated. The following results were obtained:

TABLE II

| Metallanolate or ketone | Parts by weight | Flow units | Hardening times at 160° C. in minutes |
|---|---|---|---|
| Blind test | 0 | 8 | 3.5 |
| Aluminum acetyl acetonate | 4 | 18 | 3.5 |
| Phenyl acetone | 4 | 40 | 3.5 |
| Benzoyl acetone | 4 | 24 | 3.5 |
| Benzophenone | 4 | 31 | 4.5 |
| Acetophenone | 4 | 17 | 5 |

EXAMPLE 3

100 parts by weight of a phenylmethylpolysiloxane which was solid at room temperature having about 4% by weight of silicon bonded hydroxyl groups, 1% by weight ethoxy groups, 0.6 phenyl group per silicon atom and a total of 1.1 SiC bonded phenyl and methyl groups per silicon atom was dissolved in 50 parts by weight of methylenechloride. The material thus obtained was mixed in a vacuum meter with a mixture consisting of 200 parts by weight of wollastonite flour ($CaSiO_3$), 2 parts by weight of calcium stearate, 4 parts by weight of iron oxide black and various quantities of basic lead carbonate and aluminum acetyl acetonate which are shown in Table III. After vaporizing the solvent at reduced pressure, the material was ground into a powder. Parts of the molding materials thus obtained were subjected to the spiral flow test described in Example 1 shortly after the preparation. Other parts of the molding materials were subjected to various storage conditions which are shown in Table III. The following results were obtained:

TABLE III

| Basic lead carbonate percent [1] | Aluminum acetyl acetonate percent [1] | Flow unit shortly after preparation | Storage temperature, °C. | Flow units after— | | | |
|---|---|---|---|---|---|---|---|
| | | | | 2 weeks | 4 weeks | 3 months | 12 months |
| 0.9 | 0 | 38 | 25 | 39 | 39 | 35 | (²) |
| | | | 5 | 39 | 39 | (²) | 39 |
| 0.9 | 0.75 | 49 | 25 | 49 | 50 | 51 | (²) |
| | | | 5 | 48 | 50 | (²) | 48 |
| 0.9 | 3.0 | 58 | 25 | 59 | 59 | 55 | (²) |
| | | | 5 | 59 | 59 | (²) | 59 |
| 1.8 | 0.75 | 34 | 25 | 34 | 37 | 33 | (²) |
| | | | 5 | 35 | 35 | (²) | 36 |
| 1.8 | 1.5 | 36 | 25 | 39 | 35 | 37 | (²) |
| | | | 5 | 40 | 40 | (²) | 37 |
| 1.8 | 3.0 | 40 | 25 | 41 | 55 | 57 | (²) |
| | | | 5 | 58 | 40 | (²) | 40 |

[1] Weight percent calculated on the weight of the organopolysiloxanes.
² Not determined.

EXAMPLE 4

Solutions of 100 parts by weight of the phenylmethylpolysiloxane described in Example 2 in 50 parts by weight of acetone were mixed with a mixture of 150 parts by weight of quartz flour, 150 parts by weight of commercially unsized glass fibers, which display about 0.4 percent by weight of organosiloxy groups at their surface after treatment with n-beta-aminoethyl-gamma-aminopropyltrimethoxysilane and which have an average length of 0.2 mm., 1 part by weight of basic lead carbonate, 2 parts by weight of calcium steaarte, 4 parts by weight of iron oxide red and aluminum acetyl acetonate in a quantity as shown in Table IV, in a vacuum kneader. After vaporizing the solvent at reduced pressure, the material was ground into a powder, the molding materials thus obtained were subjected to a spiral flow test as is described in Example 1; and furthermore, the hardening times (cf. Example 1) were determined.

TABLE IV

| Parts by weight | Flow units | Curing times at 160° C. in minutes |
|---|---|---|
| 0 | 10 | 3 |
| 4 | 26 | 3 |
| 6 | 38 | 3.5 |

That which is claimed is:

1. A heat curable molding composition consisting essentially of (1) an organopolysiloxane resin containing an average of 0.9 to 1.7 organic substituents per silicon atom, said organic substituents being selected from the group consisting of hydrocarbon and halogenohydrocarbon radicals, there being from 0.3 to 1.2 phenyl radicals per silicon atom, said resin containing at least 0.1 percent by weight hydroxyl groups and up to 3 percent by weight alkoxy groups bonded to silicon, (2) a filler, (3) a lead compound as catalyst said lead compound being selected from the group consisting of basic lead carbonate, lead carbonate, lead monoxide and lead dioxide, and (4) 0.1 to 15 percent by weight based on the weight of organopolysiloxane (1) of a ketone or metallanolate of a ketone having a boiling point of at least 140° C. at 760 mm. Hg (abs.) and a melting point below the temperature at which the molding operation is carried forward.

2. The molding composition of claim 1 wherein the organopolysiloxane resin (1) contains at least 0.1% by weight of silicon bonded hydroxyl groups, an average of 0.3 to 1.2 phenyl radicals per silicon atom, a total average of organic substituent to silicon ratio in the range from 0.9/1 to 1.7/1 and up to 3% by weight of alkoxy substituents bonded to silicon.

3. The molding composition of claim 2 wherein the ketone (4) is (a) an aromatic ketone, (b) a long-chained aliphatic ketone containing at least 10 carbon atoms per aliphatic radical or a mixture of (a) and (b).

4. The molding composition of claim 2 wherein the ketone ingredient (4) is aluminum acetyl acetonate.

5. The molding composition of claim 1 wherein the inorganic lead compound is basic lead carbonate, lead monoxide or lead dioxide.

6. The molding composition of claim 1 wherein the inorganic lead compound is basic lead carbonate, lead carbonate or lead dioxide.

7. A heat curable composition consisting essentially of (1) 100 parts by weight of an organopolysiloxane resin containing an average of 0.9 to 1.7 organic substituents per silicon atom, said organic substituents being selected from the group consisting of hydrocarbon and halogenohydrocarbon radicals, there being from 0.3 to 1.2 phenyl radicals per silicon atom, said resin containing at least 0.1 percent by weight hydroxyl groups and up to 3 percent by weight alkoxy groups bonded to silicon, (2) 50 to 500 parts by weight of a filler, (3) 0.5 to 5 parts by weight of a lead compound as curing catalyst for said resin (1), said lead compound being selected from the group consisting of basic lead carbonate, lead carbonate, lead monoxide and lead dioxide, and (4) 0.1 to 15 parts by weight of a ketone or metallanolate of a ketone having a boiling point of at least 140° C. at 760 mm. Hg (abs.) and a melting point below the temperature employed in the molding operation.

8. The heat curable molding composition of claim 1 wherein the organopolysiloxane contains the required phenyl substituents and the remaining organic substituents are methyl, ethyl, propyl, vinyl, 3,3,3-trifluoropropyl or a mixture of such radicals.

9. The heat curable molding composition of claim 7 wherein the metallanolate of a ketone is aluminum acetyl acetonate, zinc acetyl acetonate, aluminum benzoyl acetonate, cobalt acetyl acetonate or titanium acetyl acetonate.

10. The heat curable molding composition of claim 7 containing 0.1 to 15 parts by weight of a ketone.

References Cited

UNITED STATES PATENTS

| | | | |
|---|---|---|---|
| 2,410,737 | 11/1946 | Jenny | 260—37 |
| 2,714,585 | 8/1955 | Agens | 260—46.5 |
| 3,127,363 | 3/1964 | Nitzsche et al. | 260—18 |
| 3,208,961 | 9/1965 | Kookootsedes | 260—18 |
| 3,264,260 | 8/1966 | Muller et al. | 260—46.5 |
| 3,294,739 | 12/1966 | Weyenberg | 260—46.5 |
| 3,308,088 | 3/1967 | Wada et al. | 260—33.4 |
| 3,334,067 | 8/1967 | Weyenberg | 260—46.5 |
| 3,334,104 | 9/1967 | Hyde | 260—32.8 |
| 3,481,899 | 12/1969 | Marwitz et al. | 260—17.4 |

FOREIGN PATENTS

| | | | |
|---|---|---|---|
| 950,891 | 2/1964 | Great Britain | 260—46.5 |

DONALD E. CZAJA, Primary Examiner

M. I. MARQUIS, Assistant Examiner

U.S. Cl. X.R.

252—63.7 R; 260—18 S, 32.8 SB, 37 SB, 46.5 R, 46.5 G; 264—56